D. BAKER.

Improvement in Spouts and Lids for Pitchers.

No. 5,129. Reissued Nov. 5, 1872.

Attest;
Wm. S. Miller
Jno. D. Patten

Inventor;
David Baker
By J. J. Johnston & Bro.
his attorneys.

AM. PHOTO-LITHOGRAPHIC CO. N.Y. (OSBORNE'S PROCESS.)

UNITED STATES PATENT OFFICE.

DAVID BAKER, OF HARWICH, MASSACHUSETTS, ASSIGNOR TO GEORGE M. IRWIN.

IMPROVEMENT IN SPOUTS AND LIDS OF PITCHERS.

Specification forming part of Letters Patent No. 28,726, dated June 19, 1860; reissue No. 5,129, dated November 5, 1872.

*To all whom it may concern:*

Be it known that I, DAVID BAKER, of Harwich, in the county of Barnstable and State of Massachusetts, have invented a new and useful Improvement in the Spouts and Lids of Pitchers, and other vessels for containing and dispensing sirups, molasses, and other liquids; and I do hereby declare that the following is a full, clear, and exact description thereof, reference being had to the accompanying drawing and to the letters of reference marked thereon.

The nature of my invention consists in a molasses-pitcher or other vessel, provided with an inner spout or lip and a receiving channel, either separately or in combination with an inner lid, the same being so disposed and arranged as to prevent the drippings of the liquids reaching the outside of the vessel, (as is the case with the spout of the ordinary construction,) the same being arrested and returned back into the vessel by a channel formed between the inner spout or lip and the outer lip surrounding the same.

I will now proceed to describe the construction and operation of this invention, reference being had to the accompanying drawing, in which—

Figure 1:
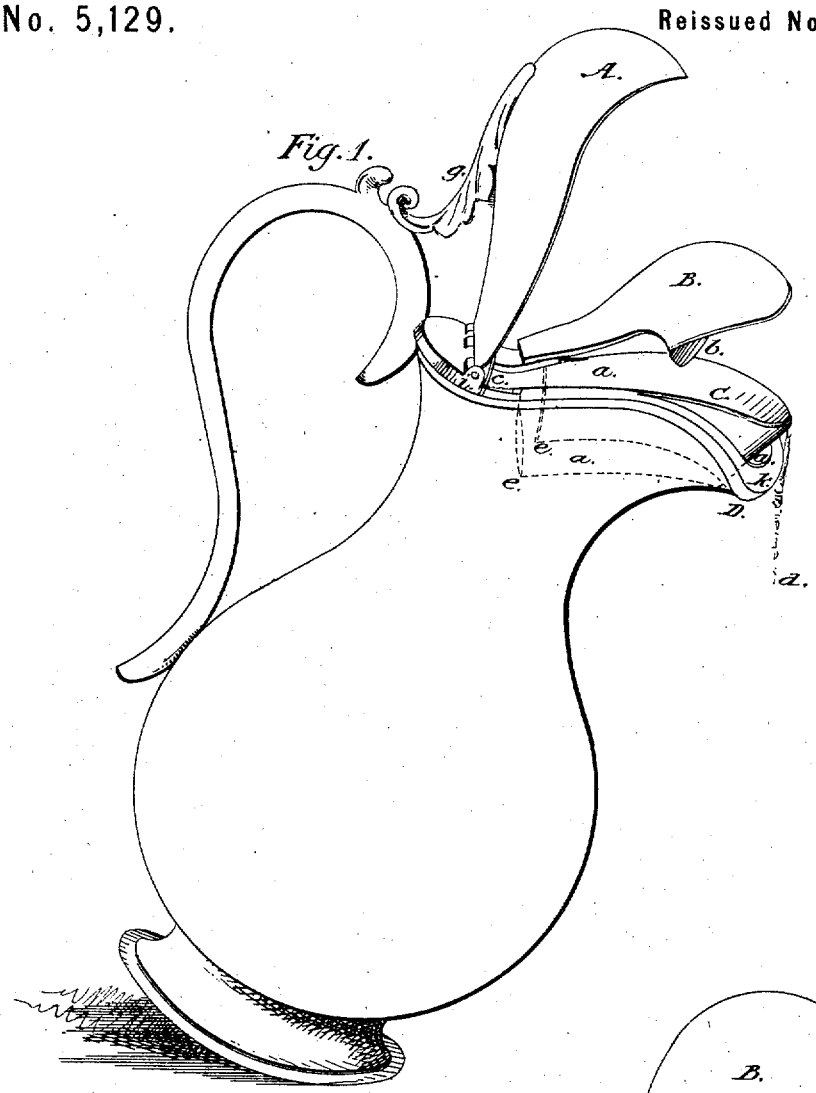
Figure 2:
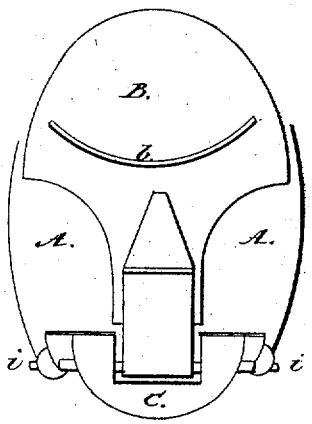

Figure 1 is a perspective view of a pitcher which I have constructed for holding and dispensing molasses or other liquids, the same being represented slightly inclined, as in the act of pouring the liquid therefrom. Fig. 2 is a front elevation, showing the interior of the outer and inner lid with their appendages.

This invention is applicable to all vessels from which it may be desirable to draw or pour liquids without soiling the outside. Said vessels, with their spouts, lids, and other appendages, may be constructed, either wholly or in part, of any metallic substance, of glass, of china, or of any convenient material. It is well known that in using a pitcher, or any other vessel of the ordinary construction, for dispensing liquids, the utmost care will not insure against the accumulation of the liquid upon the outside, rendering it unsightly, soiling other articles with which it may come in contact, and requiring it to be ofter cleaned and rubbed, thereby soon impairing the polish of most metallic vessels. To obviate these annoyances is the object of this invention.

These vessels may be constructed in any of the several forms, arranging the spout and outer wall or lip (which surrounds the spout) in such a manner as to form the channel or passage *a a a*, Fig. 1, by which the drippings may be arrested and conducted back and deposited in the vessel, thus avoiding the outward soiling of the vessel, and saving the liquid. This channel may be formed by placing the piece C (which forms the spout) within the lip D, as shown in the drawing; or the spout C may be continuous, of the material forming the body of the vessel, and a piece corresponding to the lip D placed without to form the channel, the result being the same. The bottom of this channel or groove is inclined downward, so that when the vessel is set down or held level whatever liquid it may contain will run toward the back part of the vessel and be delivered at the orifices *e e*, depositing itself in the body of liquid within the vessel. These orifices being located at or near the back part of the vessel, the liquid cannot pass up through them in the contrary direction while in the act of pouring from the spout, (if the vessel is not so full as to overflow them,) for the surface of the liquid recedes therefrom in seeking its level when the vessel is inclined forward. The outer lip D is so constructed, by means of a small cap or rim, as seen at *k*, Fig. 1, as to form a receptacle, which prevents any small quantity of liquid (which may not have had sufficient time to escape) from running over and getting upon the outside while in the act of using the vessel. The object of the inner lid B is to shut off the flow of the liquid when desirable. The object of the segment *b*, seen in Fig. 1 and Fig. 2, is to prevent any liquid that may adhere to the lid or faucet B from running down upon the hinge at *i i*, Fig. 2, while standing open. The outer lid A A has a short lever, *c*, attached to it, extending back of the pivot *i i*, Fig. 2, on which both lids turn. This lever is so arranged that, in the act of lifting the outer lid A to its full height, the inner lid B is thereby raised to a sufficient height for the liquid to pass under it. It will be seen in the drawing, Fig. 1, that the relative length or extent and position of the spout C and the lip D is such that the liquid, falling perpendicularly in the act of pouring from the spout, will overreach and pass clear of the channel *a a a* and lip D, as seen at *d*, Fig. 1, thus avoiding any necessity of soiling the vessel outwardly.

The operation is as follows: Placing the thumb upon the lifter *g*, which is attached to the lid A, Fig. 1, and raising the same to its full height, in the act of which the lever *c*, (being fixed to the outer lid A A, Fig. 2,) comes in contact with the inner lid B, lifting it sufficiently high for the passage of the liquid, as shown in Fig. 1; the vessel is then to be suitably inclined, and when the required quantity is drawn therefrom the flow of the liquid may be suddenly checked (if desired) by allowing the inner lid B to close, which, if its own weight is found (in any case) insufficient, it may be made effectual by a slight touch of the finger, keeping the vessel still inclined until the liquid is cut off by the inner lid B, after which the vessel may be set down and the outer lid closed over the whole; and when used without lids the flow of the liquid is checked in the ordinary manner of the vessels.

What I claim as my invention, and desire to secure by Letters Patent, is—

1. The lip of a molasses-pitcher or analogous vessel, provided with a lid, inner spout or lip, and channel, substantially as herein described, and for the purpose set forth.

2. The combination of the lip D and lid A with the spout C, channel *a a a*, and lid B, substantially as herein described, and for the purpose set forth.

DAVID BAKER.

Witnesses:
CHAS. B. F. ADAMS,
CHAS. HALL ADAMS.